US009392435B2

(12) United States Patent
Zhang et al.

(10) Patent No.: US 9,392,435 B2
(45) Date of Patent: *Jul. 12, 2016

(54) METHOD, SYSTEM AND APPARATUS FOR ACCESSING A VISITED NETWORK

(71) Applicant: Huawei Technologies Co., Ltd., Shenzhen, Guangdong (CN)

(72) Inventors: Peng Zhang, Beijing (CN); Wenlin Zhang, Shenzhen (CN); Hai Zhang, Langfang (CN); Chengzhen Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

This patent is subject to a terminal disclaimer.

(21) Appl. No.: 14/287,821

(22) Filed: May 27, 2014

(65) Prior Publication Data

US 2014/0273969 A1   Sep. 18, 2014

Related U.S. Application Data

(63) Continuation of application No. 12/029,325, filed on Feb. 11, 2008, now Pat. No. 8,776,184, which is a continuation of application No. PCT/CN2006/001771, filed on Jul. 20, 2006.

(30) Foreign Application Priority Data

Aug. 12, 2005   (CN) .......................... 2005 1 0090294

(51) Int. Cl.
*H04L 29/06* (2006.01)
*H04W 8/04* (2009.01)
(Continued)

(52) U.S. Cl.
CPC ................. *H04W 8/04* (2013.01); *H04L 63/08* (2013.01); *H04L 63/0892* (2013.01); *H04L 63/101* (2013.01); *H04W 12/06* (2013.01); *H04W 12/08* (2013.01); *H04W 8/06* (2013.01)

(58) Field of Classification Search
CPC ....... H04W 8/04; H04W 12/06; H04W 12/08; H04L 63/101
See application file for complete search history.

(56) References Cited

U.S. PATENT DOCUMENTS 6,421,339 B1   7/2002 Thomas
6,725,036 B1   4/2004 Faccin et al.
(Continued)

FOREIGN PATENT DOCUMENTS

CN   1432247 A   7/2003
CN   1610319 A   4/2005
(Continued)

OTHER PUBLICATIONS

Written Opinion of the International Searching Authority in corresponding PCT Application No. PCT/CN2006/001771 (Nov. 9, 2006).
(Continued)

*Primary Examiner* — Jeffrey Pwu
*Assistant Examiner* — Thong Truong
(74) *Attorney, Agent, or Firm* — Leydig, Voit & Mayer, Ltd.

(57) ABSTRACT

The present application relates to a user accessing to a visited network in a wireless telecommunication network. After receiving an access request from the user for selecting a visited network and detecting the visited network selected by the user has changed, an AAA server device initiates a request for obtaining authentication and/or authorization information of the user from a HSS. In the process of obtaining the authentication and/or authorization information, the HSS checks whether the user is authorized to access to the visited network according to a list of authorized visited networks stored in the HSS.

18 Claims, 10 Drawing Sheets

(51) Int. Cl.
*H04W 12/06* (2009.01)
*H04W 12/08* (2009.01)
*H04W 8/06* (2009.01)

(56) References Cited

U.S. PATENT DOCUMENTS

| | | |
|---|---|---|
| 2003/0027569 A1 | 2/2003 | Ejzak |
| 2005/0166043 A1 | 7/2005 | Zhang et al. |
| 2005/0243766 A1 | 11/2005 | Tsirtsis et al. |
| 2005/0249176 A1 | 11/2005 | O'Neill et al. |
| 2006/0068778 A1* | 3/2006 | Della-Torre .......... 455/432.1 |
| 2006/0077925 A1 | 4/2006 | Rune |
| 2006/0077926 A1 | 4/2006 | Rune |
| 2006/0077986 A1* | 4/2006 | Rune .......................... 370/401 |
| 2006/0111082 A1 | 5/2006 | Zhang et al. |
| 2006/0153135 A1 | 7/2006 | Ascolese et al. |
| 2007/0100981 A1 | 5/2007 | Adamczyk et al. |
| 2009/0196265 A1 | 8/2009 | Mariblanca Nieves et al. |

FOREIGN PATENT DOCUMENTS

| | | |
|---|---|---|
| CN | 1327663 C | 7/2008 |
| EP | 1317159 A1 | 1/2003 |
| EP | 1662813 A1 | 5/2006 |
| WO | WO 0193523 A2 | 12/2001 |
| WO | WO 2004008683 A2 | 1/2004 |
| WO | WO 2005002140 A1 | 1/2005 |

OTHER PUBLICATIONS

International Search Report in corresponding PCT Application No. PCT/CN2006/001771 (Nov. 9, 2006).
1$^{st}$ Office Action in corresponding Chinese Application No. 2005100902942 (Jan. 12, 2007).
2$^{nd}$ Office Action in corresponding European Application No. 06761506.2 (Feb. 16, 2010).
3$^{rd}$ Office Action in corresponding European Application No. 06761506.2 (Aug. 24, 2011).
"3GPP TS 23.008—3rd Generation Partnership Project; Technical Specification Group Core Network; Organization of subscriber data (Release 6)," Mar. 2005, Version 6.5.0, 3rd Generation Partnership Project, Valbonne, France.
"3GPP TS 23.234—3rd Generation Partnership Project; Technical Specification Group Services and System Aspects; 3GPP System to Wireless Local Area Network (WLAN) Interworking; System Description (Release 6)," Mar. 2005, Version 6.4.0, 3$^{rd}$ Generation Partnership Project, Valbonne, France.
"3GPP TS 29.234—3rd Generation Partnership Project; Technical Specification Group Core Network and Terminals; 3GPP System to Wireless Local Area Network (WLAN) Interworking; Stage 3 (Release 6)," Jun. 2005, Version 6.3.0, 3rd Generation Partnership Project, Valbonne, France.
"IEEE Std 802.11 b-1999—Part 11: Wireless LAN Medium Access Control (MAC) and Physical Layer (PHY) Specifications: Higher-Speed Physical Layer Extension in the 2.4 GHz Band," Supplement to IEEE Standard for Information Technology, Telecommunications and information exchange between systems, Local and metropolitan area networks, Specific requirements, Sep. 16, 1999, Supplement to ANSI/IEEE Std 802.11, 1999 Edition, Institute of Electrical and Electronics Engineers, New York, New York.
"WiMAX End-to-End Network Systems Architecture, Stage 2: Architecture Tenets, Reference Model and Reference Points," NWG Stage 2 Specification, Apr. 20, 2005, WiMAX, Beaverton, Oregon.
Final Office Action in Corresponding U.S. Appl. No. 12/029,325 (Oct. 28, 2013).
Office Action in Corresponding U.S. Appl. No. 12/029,325 (Apr. 1, 2013).
Final Office Action in Corresponding U.S. Appl. No. 12/029,325 (Jul. 13, 2011).
Office Action in Corresponding U.S. Appl. No. 12/029,325 (Jan. 4, 2011).

* cited by examiner

METHOD, SYSTEM AND APPARATUS FOR ACCESSING A VISITED NETWORK

CROSS REFERENCE TO RELATED APPLICATIONS

This application is a continuation of U.S. patent application Ser. No. 12/029,325, filed on Feb. 11, 2008, which is a continuation of International Application No. PCT/CN2006/001771, filed on Jul. 20, 2006. The International Application claims priority to Chinese Patent Application No. 200510090294.2, filed on Aug. 12, 2005. The afore-mentioned patent applications are hereby incorporated by reference in their entireties.

FIELD OF THE INVENTION

The present invention relates to wireless telecommunication networks, and more particularly, to a method, a system and an apparatus for accessing a visited network.

BACKGROUND OF THE INVENTION

As users require higher and higher radio access rate, wireless local area network (WLAN) emerges accordingly to meet the requirement. The WLAN can provide high speed wireless data access in a smaller range. The WLAN includes various access technologies. At present, IEEE 802.11b is a widely used technical standard. It transmits in the 2.4 GHz band, and the maximum transmission rate may reach 11 Mbps. IEEE 802.11g and Bluetooth technology also transmits in the 2.4 GHz band, of which the maximum data transmission rate of IEEE 802.11g may reach 54 Mbps. Other new technologies such as IEEE 802.11a and ETSI BRAN Hiperlan2 use the 5 GHz band, and the transmission rate may reach up to 54 Mbps.

In spite of various radio access technologies, most WLANs are used to transmit Internet protocol (IP) packets. In general, the WLAN access technology used by a wireless IP network is transparent for the upper-layer IP. The basic principle is that an access point (AP) is used to complete the access of user equipment (UE), network control equipment and connection equipment are connected to to form an IP transmission network.

With emergence and development of the WLAN technology, interworking between WLAN and wireless mobile communication networks such as GSM system, CDMA system, WCDMA system, TD-SCDMA system and CDMA2000 system is becoming a research focus currently. In the 3rd Generation Partnership Project (3GPP), a UE may be connected to Internet or Intranet through a WLAN access network. It can also be connected to a home network or a visited network of the 3GPP system via a WLAN access network. To be specific, when a UE accesses to a WLAN locally, it is connected to the home network of 3GPP via the WLAN access network; when the UE is roaming, it is connected to the visited network of 3GPP via the WLAN access network. Some entities in the visited network of 3GPP are connected with corresponding entities in the home network of 3GPP. For example, the authentication, authorization and accounting (AAA) proxy in the visited network of 3GPP is connected with the AAA server which is located in the home network of 3GPP; the WLAN access gateway (WAG) which is located in the visited network of 3GPP is connected with the packet data gateway (PDG) which is located in the home network of 3GPP.

Due to mobility of a user in wireless networks, the user often needs to access services during roaming, which results in the following two situations:

1. When a user is roaming, there may be multiple roaming (or visited) networks available. Due to the agreements between the home network of the user and the roaming networks, the user may not access all of the available networks. In this case, when the user selects a roaming network to access, the home network would authenticate the roaming network. Namely, the home network needs to check whether the user is authorized to access the roaming network selected by the user. In this procedure, in the home network, it involves storage, transfer and use of information of roaming networks which the user are authorized to access.

2. To reduce the possibilities of a user selecting a network which it is not authorized to access, the information of the authorized visited network may be stored in the UE. Due to technical and operational reasons, the information stored in the UE may be nonsynchronous with the current authorized visited networks. In this case, the information of the authorized visited networks stored in the UE need to be updated.

In the prior technology, the information of authorized visited networks for the user to access is stored only in the home subscriber server (HSS). When a user selects a visited network during roaming and initiates an access authentication and/or authorization request, the AAA server initiates a request to the home HSS for obtaining authentication and/or authorization information if it checks that the authentication and/or authorization information for the user is not stored locally.

Based on the stored information of authorized visited networks for the user to access, if the HSS finds that the user is authorized to access the visited network, the HSS delivers at least one group of security parameters for authenticating and corresponding authorization information to the AAA server.

The AAA server stores the security parameters and corresponding authorization information locally.

When the user selects another visited network and initiates an authorization and/or authentication request, the AAA server does not initiate a request for obtaining authentication and authorization information to the HSS after checking that the security parameters for authenticating the validity of the user is stored locally. As the AAA server does not store the information of the authorized visited networks for the user to access, it cannot check whether the user can access the visited network.

SUMMARY OF THE INVENTION

Embodiments of the present invention provide a method for accessing a visited network to solve the problem that when a user access a visited network, network side cannot correctly check whether the user is authorized to access the visited network in the prior technology.

According to the method provided in the embodiments of the present invention, the embodiments of the present invention provide a user information application apparatus and a user information storage apparatus and a system for accessing a visited network.

Embodiments of the present invention provide a method for accessing a visited network; the method may include the following steps:

A user initiates an access request to a user information application apparatus for selecting a visited network.

The user information application apparatus detects whether the visited network selected by the user has changed, if the visited network selected by the user has changed; the user information application apparatus performs the following steps:

The user information application apparatus obtains a list of authorized visited networks from a user information storage apparatus and checks whether the user is authorized to access the visited network according to the information of the list of authorized visited networks; or the information application apparatus ask the user information storage apparatus to check whether the user is authorized to access the visited network.

If the user is authorized to access the visited network, the user information application apparatus returns an access accept response to the user, allowing the user to access the visited network.

For example, the access request is an authentication and/or authorization request, and the access accept response is an authentication and/or authorization accept response.

The step of the user information storage apparatus checking whether the user is authorized to access the visited network may include the following steps concretely:

The user information application apparatus sends an acknowledgment request containing an identifier of the visited network selected by the user to the user information storage apparatus.

If checking that the user is authorized to access the visited network according to the list of authorized visited networks, the user information storage apparatus returns an access accept response to the user information application apparatus.

The above method of the embodiment of the invention may further include the following steps:

The user information application apparatus initiates a request for obtaining authentication and/or authorization information to the user information storage apparatus and for requesting whether the user is authorized to access the visited network. The user information storage apparatus returns the authentication and/or authorization information of the user and an access accept or reject response to the user information application apparatus in accordance with the request.

The above method of the embodiment of invention may further include the following the steps:

The user information application apparatus checks whether the authentication and/or authorization information of the user is stored user in the information application apparatus. If the authentication and/or authorization information of the user is stored in the information application apparatus, the user information application apparatus sends an acknowledgement request containing the identifier of the visited network to the user information storage apparatus. The user information storage apparatus returns an access accept or reject response to the user information application apparatus in accordance with the acknowledgement request.

If the authentication and/or authorization information of the user is not stored in the information application apparatus, the user information application apparatus initiates a request to the user information storage apparatus, for obtaining the authentication and/or authorization information and for asking the user information storage apparatus to check whether the user is authorized to access the visited network. The user information storage apparatus returns the authentication and/or authorization information of the user and an access accept or reject response to the user information application apparatus in accordance with the request.

According to the above method of the embodiment of the invention, the acknowledgement request sent by the user information application apparatus via a customized signaling message or idle or new parameters in an existing protocol signaling message to the user information storage apparatus.

The above method of the embodiment of invention further includes:

The user information application apparatus checks whether the authentication and/or authorization information of the user is stored locally. If the authentication and/or authorization information of the user is stored locally, the user information application apparatus initiates a request for obtaining the list of visited networks authorized for the user. The user information storage apparatus sends the list of visited networks authorized for the user to the user information application apparatus.

If the authentication and/or authorization information of the user is not stored locally, the user information application apparatus initiates a request for obtaining the authentication and/or authorization information to the user information storage apparatus and requests to obtain the list of visited networks authorized for the user. The user information storage apparatus returns the locally stored authentication and/or authorization information of the user and the list of visited networks authorized for the user to the user information application apparatus.

The above method of the embodiment of the invention may further include the following steps:

The user sends a request for updating the list of authorized visited networks to the user information application apparatus according to a preset period.

After checking that the user is valid, the user information application apparatus sends the locally stored list of visited networks authorized for the user or the list of visited networks authorized for the user to access obtained from the user information storage apparatus to the user.

The above method of the invention further includes:

The user information storage apparatus sends a notification for updating the list of visited networks authorized for the user to access to the user information application apparatus.

If checking that the user is online, the user information application apparatus forwards the update notification to the user.

After receiving the update notification, the user sends a request for updating the list of authorized visited networks to the user information application apparatus.

The user information application apparatus obtains the list of authorized visited networks from the user information storage apparatus and sends the list to the user.

The above method of the embodiment of the invention may further include the following steps:

The user information storage apparatus pushes the list of authorized visited networks to the user information application apparatus.

The user information application apparatus pushes the received list of authorized visited networks to the user.

The list of visited networks authorized for the user includes authorized visited access networks and/or authorized visited core networks.

According to the above method of the embodiment of the invention, when detecting that the visited network selected by the user has not changed, the user information application apparatus performs the regular authentication and/or authorization flow in the prior technology.

The embodiment of the invention provides a user information application apparatus, including an authentication and authorization module, a detecting module and a checking module.

The authentication and authorization module is adapted to receive an access authentication and/or authorization request initiated by a user when the user selects a visited network, check whether the user is valid according to the authentication and/or authorization information of the user, and return an authentication and/or authorization accept or reject response to the user according to the result of checking whether the user is authorized to access the visited network by the checking module.

The detecting module is adapted to detect whether the visited network selected by the user has changed. When the visited network has changed, the checking module is triggered.

The checking module is adapted to obtain a list of authorized visited networks from a user information storage apparatus and check whether the user is authorized to access the visited network according to the information of the list of the authorized visited networks; or the checking module is adapted to request the user information storage apparatus to check whether the user is authorized to access the visited network and send the checking result to the authentication and authorization module.

According to the user information application apparatus provided by the invention, the checking module includes:

An obtaining sub-module, which is adapted to obtain the list of visited networks authorized from the user information storage apparatus and stores it;

A checking sub-module, which is adapted to check whether the user is authorized to access the visited network according to the obtained list of authorized visited networks;

A sending sub-module, which is adapted to send the checking result of the checking sub-module to the authentication and authorization module.

In another embodiment of the invention, the checking module may include:

A requesting sub-module, which is adapted to send an acknowledgment request message containing the identifier of the visited network to the user information storage apparatus, asking the user information storage apparatus to check whether the user is authorized to access the visited network;

A receiving sub-module, which is adapted to receive the result of checking whether to allow the user to access the visited network by the user information storage apparatus;

A sending sub-module, which is adapted to send the checking result of the user information storage apparatus to the authentication and authorization module.

The user information application apparatus, for example, is an independent network entity with external interfaces or a logical unit of an existing network entity.

The existing network entity, for example, is a 3GPP AAA server.

The embodiment of the present invention provides a user information storage apparatus, including a storage module and an information sending module.

The storage module stores a list of visited networks authorized and authentication and/or authorization information of the user.

The information sending module is adapted to send the list of authorized visited networks and authentication and/or authorization information of the user to the user information application apparatus in accordance with a request of the user information application apparatus.

The user information storage apparatus provided by the embodiment of the invention may further include an acknowledging module.

The acknowledging module is adapted to receive an acknowledgment request message containing the identifier of the visited network from the user information application apparatus, check whether the user is authorized to access the visited network according to the list of authorized visited networks stored in the storage module, and send the checking result to the information sending module. The information sending module then sends the checking result to the user information application apparatus.

The user information storage apparatus, for example, is an independent network entity with external interfaces or a logical apparatus of an existing network entity.

The existing network entity, for example, is a home location register (HLR) or an HSS.

The embodiment of the present invention provides a system for accessing a visited network, which includes a user information application apparatus and a user information storage apparatus.

The user information application apparatus includes an authentication and authorization module, a detecting module and a checking module.

The authentication and authorization module is adapted to receive an access authentication and/or authorization request initiated by a user which selects a visited network, check whether the user is valid according to the authentication and/or authorization information of the user, and return an authentication and/or authorization accept or reject response to the user according to the result of checking whether the user is authorized to access the visited network by the checking module.

The detecting module is adapted to detect whether the visited network has changed. When the visited network has changed, the checking module is triggered.

The checking module is adapted to obtain a list of authorized visited networks from the user information storage apparatus and check whether the user is authorized to access the visited network according to the information of the list of authorized visited networks; or the checking module is adapted to request the user information storage apparatus to check whether the user is authorized to access the visited network and send the checking result to the authentication and authorization module.

The user information storage apparatus may include a storage module and an information sending module.

The storage module is adapted to store the list of authorized visited networks and the authentication and/or authorization information of the user.

The information sending module is adapted to send the list of authorized visited networks and authentication and/or authorization information of the user to the user information application apparatus in accordance with the request of the user information application apparatus.

According to the above system provided by the embodiment of the present invention, the user information storage apparatus may further include an acknowledging module.

The acknowledging module is adapted to receive an acknowledgment request message containing the identifier of the visited network selected by the user from the user information application apparatus, check whether the user is authorized to access the visited network according to the list of authorized visited networks. The information sending module is adapted to send the checking result to the user information application apparatus. Many benefits may be achieved by way of the embodiments of the present invention, for example:

1. When a user selects a visited network and initiates an authentication and authorization request, there is provided a complete authentication and authorization signaling flow, which can effectively check whether the user is authorized to access the visited network.

2. The embodiments of the invention also provides multiple methods for updating the list of visited networks stored in the UE so that the list can be updated synchronously with the visited networks authorized by the operator for the user to access.

DETAILED DESCRIPTION OF THE INVENTION

Figure 1:
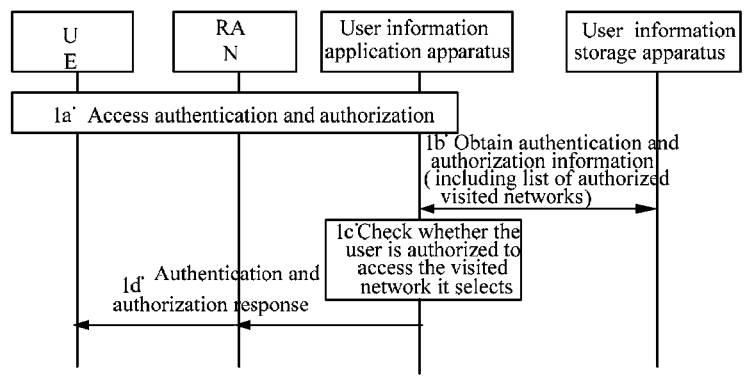
FIG. 1 shows a simplified flowchart illustrating a method for accessing a visited network in accordance with an embodiment of the present invention

The embodiments of the present invention provide a method for accessing a visited network. The method may include the following steps:

A user selects a visited network and initiates an access request to a user information application apparatus.

The user information application apparatus detects whether the visited network selected by the user has changed. When the visited network selected by the user has changed, the user information application apparatus obtains a list of authorized visited networks from a user information storage apparatus and checks whether the user is authorized to access the visited network according to the information of the list of authorized visited networks; or the user information storage apparatus checks whether the user is authorized to access the visited network.

If the user is authorized to access the visited network, the user information application apparatus returns an access accept response to the user, allowing the user to access the visited network; otherwise, the user information application apparatus returns an access reject response, not allowing the user to access the network.

In the embodiments of the present invention, a list of authorized visited networks for a user to access is stored in a user information storage apparatus at the network side. When a user initiates a request for authentication and/or authorization to a user information application apparatus at the network side through a radio access network (RAN), the following two methods are available for achieving this objective:

Method 1: The user information application apparatus downloads the list of authorized visited networks for the user to access, and checks whether the user is authorized to access the visited network. The steps are as follows:

Step A: The user information application apparatus checks whether the user is valid and obtains the list of authorized visited networks from the user information storage apparatus.

Step B: The user information application apparatus checks whether the user is authorized to access the visited network according to the list of authorized visited networks. If the user is valid and authorized to access the visited network, the user information application apparatus returns an authentication and/or authorization accept response; otherwise, it returns an authentication and/or authorization reject response.

Method 2: Storing the list of authorized visited networks for the user to access in the user information storage apparatus and the user information storage apparatus checks whether the user is authorized to access the visited network. The steps are as follows:

Step a: The user information application apparatus detects whether the visited network selected by the user has changed. If yes, the procedure continues with the following steps; otherwise, the procedure continues according to the authentication and/or authorization flow in the prior art.

Step b: The user information application apparatus sends an acknowledgment request to the user information storage apparatus, requesting the user information storage apparatus to check whether the user is authorized to access the visited network.

Step c: The user information storage apparatus checks whether the user is authorized to access the visited network according to the list of authorized visited networks stored in the user information storage; and returns an access accept or a reject response to the user information application apparatus.

Step d: If the user information application apparatus receives an access accept response returned by the user information storage apparatus, and checks that the user is valid, it returns an authentication and/or authorization access accept response to the user; otherwise, it returns a reject response.

The above two methods are hereinafter described in detail with reference to the following embodiments and accompanying drawings.

FIG. 1 shows a simplified flowchart illustrating a method for accessing a visited network in accordance with an embodiment of the present invention. The method may include the following steps:

Step 1a: A RAN and a user information application apparatus perform an access authentication and authorization procedure for a UE.

If an identifier of the visited network selected by the user (UE) exists, it is sent to the user information application apparatus if necessary. For example, the identifier of the WLAN selected by the user to access the network is a home WLAN identifier in the case of non-roaming or a roaming WLAN identifier in the case of roaming. In the case of roaming, the authentication and/or authorization request contains the identifier of visited network selected by the user and the user's permanent or temporary identity. In the step, the user information application apparatus is often an AAA server.

The visited network identifier may include the identifier of the visited access network and/or the identifier of the visited core network.

For example, in a 3GPP I-WLAN (Interworking-WLAN) system, the visited network identifier may include an identifier of a 3GPP visited public land mobile network (PLMN), or an identifier of a visited WLAN, or both of them.

For example, in a WiMax system, the visited network identifier may include an identifier of a visited connectivity service network (CSN), or an identifier of a visited access service network (ASN), or both of them.

The format of a visited network identifier includes but is not limited to the following formats:
Mobile country code (MCN)+Mobile network code (MNC);
RADIUS Operator-Name attribute; format specified in GSMA PRD IR.61;
Network identifier defined by operators.
A user's identity includes but is not limited to the following:
International mobile subscriber identity (IMSI)
Mobile station international ISDN number (MSISDN)
Network access identifier (NAI)
Temporary mobile subscriber identity (TMSI) or packet TMSI (P-TMSI)
SIP URI;
Tel URI;
User's identity defined by operators Step 1b: The user information application apparatus obtains user information from the user information storage apparatus for authentication and/or authorization. The user information includes the list of authorized visited networks for the user to access.

The list of authorized visited networks may include authorized visited access network identifiers and/or authorized visited core network identifiers.

For example, the list of authorized visited networks for the user to access may include authorized 3GPP visited PLMN identifiers, or authorized visited WLAN identifiers, or both of them. Optionally, it may include the mapping between the authorized 3GPP visited PLMN identifiers and the authorized visited WLAN identifiers.

For example, the list of visited authorized networks may include authorized visited CSN identifiers, or authorized visited ASN identifiers, or both of them. Optionally, it may include the mapping between the authorized visited CSN identifiers and the authorized visited ASN identifiers.

In the step 1b, for example, the user information storage apparatus in the 3GPP system is often an HLR or an HSS.

In this embodiment, for example, the user information storage apparatus provides the user information application apparatus with the list of authorized visited networks via a customized signaling message or a signaling message of the existing protocol (by adding new parameters and corresponding values in the signaling message), for example, the Server-Assignment-Request/-Answer (SAR/SAA) of the Diameter protocol.

In the step 1b, the user information storage apparatus may check in advance whether the user is authorized to access the visited network. If yes, the user information storage apparatus returns the authentication and/or authorization information and the list of authorized visited networks to the user; otherwise, it rejects the request for authentication and/or authorization from the user information application apparatus and may explain corresponding reasons.

Step 1c: The user information application apparatus compares the visited network identifier received in step 1a with the information of the list of authorized visited networks received in step 1b, and checks whether the user is authorized to access the visited network.

Step 1d: According to the checking result in step 1c, if the user is valid and authorized to access the visited network (for example, the visited network is a RAN, or a core network or a CSN), the user information application apparatus returns an authentication and/or authorization accept response to the user.

According to the checking result in step 1c, if the user is not authorized to access the visited network or the user is invalid, the user information application apparatus returns an authentication and/or authorization reject response to the user.

Optionally, in the accept and/or reject response, the user information application apparatus sends the list of authorized visited networks to the UE, and the UE updates the list of authorized visited networks which is stored in the UE.

Optionally, the list of authorized visited networks sent to the UE may be encrypted. For example, the list of authorized visited networks is sent to the UE via an encrypted Diameter attribute value pair (AVP) or a message of encrypted extensible authentication protocol (EAP).

Figure 2:
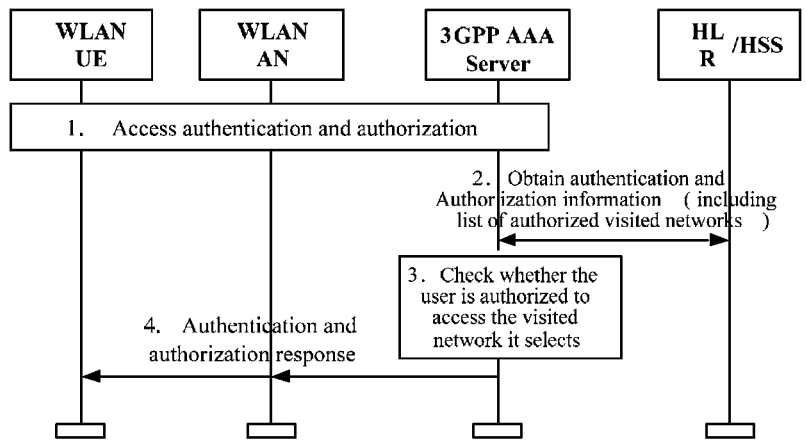
FIG. 2 shows a simplified flowchart illustrating a method for accessing a visited network in accordance with another embodiment of the present invention.

FIG. 2 shows a simplified flowchart illustrating a method for accessing a visited network in accordance with another embodiment of the present invention. The method may include the following steps:

Step 1: A WLAN AN and a 3GPP AAA Server perform an access authentication and authorization procedure for a WLAN UE. If the identifier of the WLAN AN selected by the user (WLAN UE) exists, it is also sent to the 3GPP AAA Server if necessary. In the case of roaming, the user selects a 3GPP visited PLMN (VPLMN) as the path for the authentication and/or authorization signaling. AAA messages transmitted from the WLAN UE and WLAN AN to the 3GPP AAA Server need to be forwarded through the 3GPP AAA Proxy in the VPLMN. The AAA messages may also contain the 3GPP VPLMN identifier.

Step 2: The 3GPP AAA Server obtains the security information for authentication and authorization information for user authorization from HLR/HSS. The authorization information contains a list of authorized visited networks for the user to access.

Step 3: The 3GPP AAA Server checks whether the user is valid and whether it is authorized to access the visited network according to the security information and authorization information obtained from the HLR/HSS.

Step 4: The 3GPP AAA Server returns an authentication and authorization response to the WLAN UE according to the checking result in step 3. It may contain the list of authorized visited networks in the response message.

Figure 3:
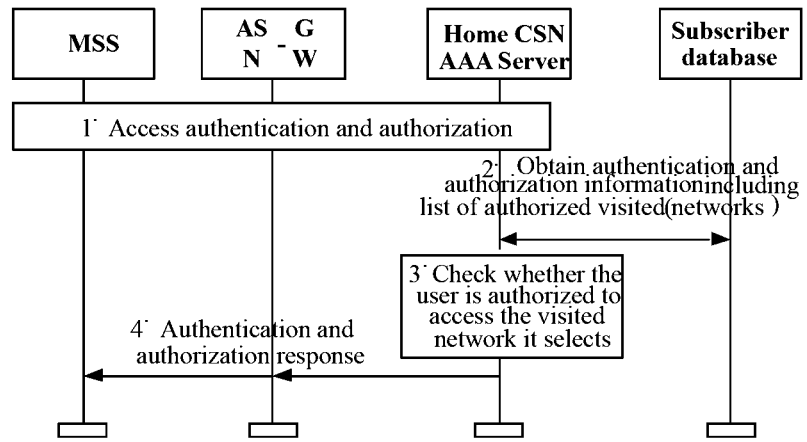
FIG. 3 shows a simplified flowchart illustrating a method for accessing a visited network in accordance with a further embodiment of the present invention.

FIG. 3 shows a simplified flowchart illustrating a method for accessing a visited network in accordance with further another embodiment of the present invention. The method may include the following steps:

Step 1: An ASN gateway (ASN-GW) and a home CSN AAA Server perform an access authentication and authorization procedure for a mobile subscriber station (MSS). If the identifier of the ASN selected by the user (MSS) exists, it is also sent to the AAA Server if necessary. In the case of roaming, the user selects a visited CSN as the path for authentication and authorization signaling. AAA messages transmitted from the MSS and ASN-GW to the home CSN AAA Server need to be forwarded by the visited CSN AAA Proxy in the visited network selected by the user. The AAA messages may also contain the visited CSN identifier.

Step 2: The home CSN AAA Server obtains the security information for authentication and the authorization information for authorization from the subscriber database. The authorization information contains the list of authorized visited networks for the user to access.

Step 3: The home CSN AAA Server checks whether the user is valid and whether it is authorized to access to the visited network according to the security information and the authorization information obtained from the subscriber database.

Step 4: The home CSN AAA Server returns an authentication and authorization response to the MSS according to the checking result in step 3. It may contain the list of authorized visited networks in the response message.

During transmission of AAA messages and authentication messages, the ASN-GW plays the role of a Network Access Server (NAS) and EAP proxy. Based on specific network structure and deployment, a base station (BS) can also play the role of an ASN-GW.

Figure 4:
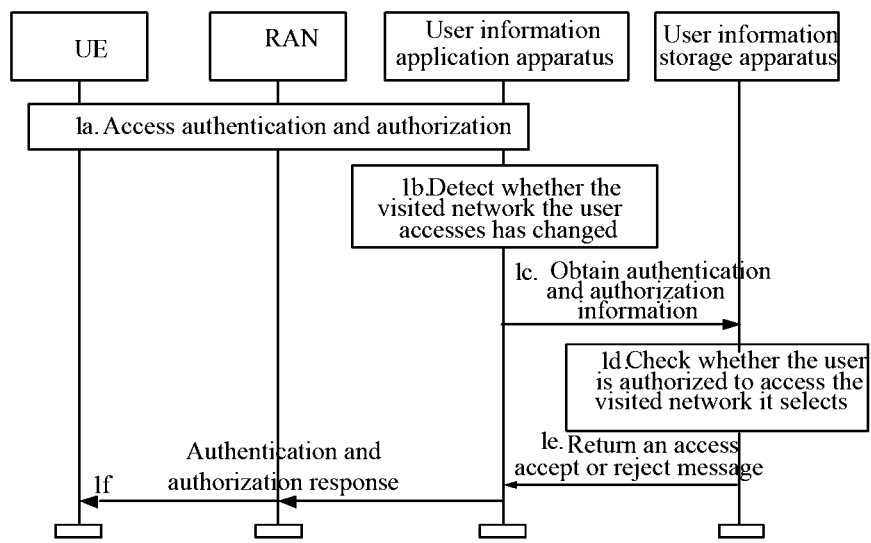
FIG. 4 shows a simplified flowchart illustrating a method for accessing a visited network in accordance with a further embodiment of the present invention.

FIG. 4 shows a simplified flowchart illustrating a method for accessing a visited network in accordance with further another embodiment of the present invention. The method may include the following steps:

Step 1a: A RAN and a user information application apparatus perform an access authentication and authorization procedure for a UE. If the identifier of the access network selected by the user (UE) exists, it is sent to the user information application apparatus if necessary. For example, the WLAN identifier selected by the user to access the network is a home WLAN identifier in the case of non-roaming or a roaming WLAN identifier in the case of roaming. In the case of roaming, the authentication and/or authorization request contains the visited network identifier selected by the user and the user's permanent or temporary identity. In step 1a, the user information application apparatus is often an AAA server in the 3GPP system. For details about the visited network identifier and user's identity, see the above description.

Step 1b: The user information application apparatus detects whether the access network and/or core network selected by the user has changed. If yes, execute step 1c.

Step 1c: The user information application apparatus requests the user information storage apparatus to check whether the user is authorized to access the visited network.

Step 1d: The user information storage apparatus checks whether the user is authorized to access the visited network.

This step may be triggered in the procedure in which the user information application apparatus obtains the authentication and authorization information from the user information storage apparatus. For further details, refer to the embodiments showed with FIG. 5 and FIG. 6.

This step may also be triggered in the procedure in which the user information application apparatus sends an acknowledgement request to the user information storage apparatus. For further details, refer to the embodiments showed with FIG. 7, FIG. 8 and FIG. 9.

Step 1e: If the user is authorized to access the visited network, the user information storage apparatus returns an access accept message to the user information application apparatus; otherwise, it returns an access reject message.

Step 1f: If the user is valid and authorized to access the visited network, the user information application apparatus returns an access authentication and authorization accept response to the user; if the user is unauthorized to access the visited network or the user is invalid, the user information application apparatus returns an authentication and authorization reject response to the user.

Figure 5:
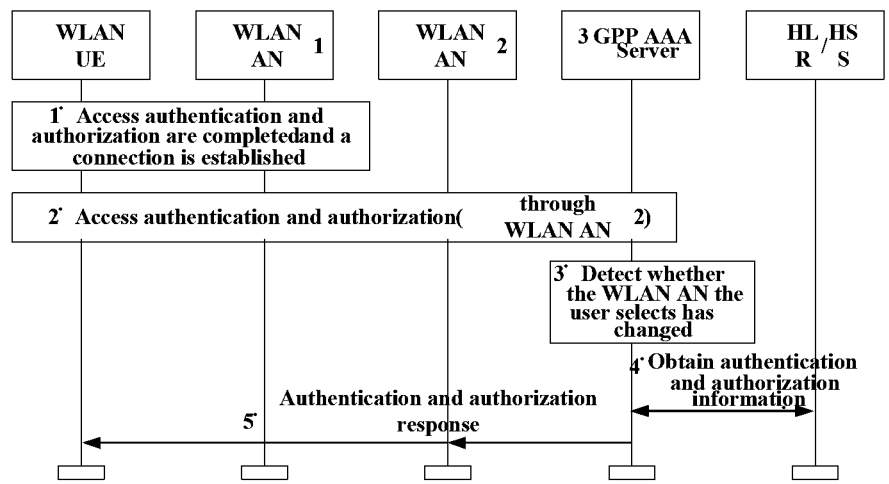
FIG. 5 shows a simplified flowchart illustrating a method for accessing a visited network in accordance with a further embodiment of the present invention.

FIG. 5 shows a simplified flowchart illustrating a method for accessing a visited network in accordance with further another embodiment of the present invention. Assuming that the visited network selected by the user has changed in this embodiment and the method may include the following steps:

Step 1: A WLAN UE has been authenticated and authorized to access services through WLAN AN 1.

Step 2: Due to some special reasons, such as handoff, the WLAN UE needs to access a network through WLAN AN 2. Therefore, WLAN AN 2 and 3GPP AAA Server perform an authentication and authorization procedure for the WLAN UE. The identifier of the WLAN AN 2 selected by the user is sent to the 3GPP AAA Server if necessary. In the case of roaming, the user selects a 3GPP VPLMN as the path for the authentication and authorization signaling. AAA messages transmitted from the WLAN UE and WLAN AN to the 3GPP AAA Server need to be forwarded through the 3GPP AAA Proxy which is located in the 3GPP VPLMN in the case of roaming. These AAA messages may contain the 3GPP VPLMN identifier.

Step 3: The 3GPP AAA Server detects that the WLAN AN selected by the user has changed according to the identifier of WLAN AN 2 obtained in step 2 and requests the HLR/HSS to check whether the user is authorized to access WLAN AN 2.

If the 3GPP AAA Server stores the authentication and authorization information of the user, it only needs to send an acknowledgement request to the HLR/HSS without obtaining the authentication and authorization information from the HLR/HSS; if the 3GPP AAA Server does not store the authentication and authorization information of the user or the stored information is no longer valid, it needs to obtain the authentication and authorization information of the user from the HLR/HSS if necessary.

The 3GPP AAA Server sends an acknowledgement request to the HLR/HSS, asking the HLR/HSS to check whether the user is authorized to access WLAN AN 2. The acknowledgement request can be carried via new parameters of Server-Assignment-Type of the SAR/SAA message.

If the 3GPP AAA Server does not have available authentication information, it obtains authentication information from the HSS. During the process, the HLR/HSS checks whether the user is authorized to access the visited network. If the 3GPP AAA Server does not have available authorization information, it may send an authorization request to the HSS to obtain authorization information. During the process, the HLR/HSS may check whether the user is authorized to access the visited network.

Step 4: The HLR/HSS checks whether the user is authorized to access WLAN AN 2 according to the stored list of authorized visited WLANs for the user to access. If the user is not authorized, the HLR/HSS returns a reject response to the 3GPP AAA Server and does not return the requested authentication and authorization information; if the user is authorized, the HLR/HSS returns an access accept message to the 3GPP AAA Server. The HLR/HSS also returns security information used for authentication and authorization information to the 3GPP AAA Server.

Step 5: If the 3GPP AAA Server receives an access accept message from the HLR/HSS and checks that the user is valid by using the security information and authorization information obtained from the HLR/HSS, it returns an authentication and authorization accept response to the WLAN UE; otherwise, it returns a reject response to reject the WLAN UE to access the network through WLAN AN 2.

Figure 6:
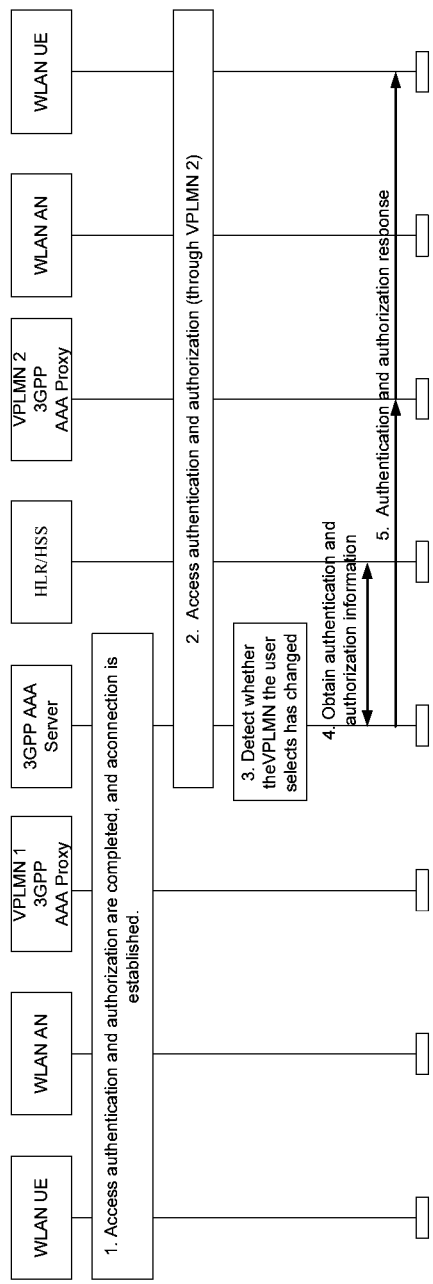
FIG. 6 shows a simplified flowchart illustrating a method for accessing a visited network in accordance with a further embodiment of the present invention.

FIG. 6 shows a simplified flowchart illustrating a method for accessing a visited network in accordance with further another embodiment of the present invention. The method may include the following steps:

Step 1: A WLAN UE has been authenticated and authorized through a WLAN AN and a VPLMN1, and the WLAN UE can access to services through the WLAN AN.

Step 2: In the case of roaming, the user (WLAN UE) selects a 3GPP VPLMN as the path for the authentication and authorization signaling. AAA messages transmitted from the WLAN UE and WLAN AN to a 3GPP AAA Server need to be forwarded through the 3GPP AAA Proxy in the 3GPP VPLMN. The AAA messages may also contain the 3GPP VPLMN identifier. Due to some special reasons such as handoff, the WLAN UE needs to access the network through VPLMN2. Therefore, a VPLMN2 and the 3GPP AAA Server perform an authentication and authorization procedure for the WLAN UE. If the identifier of the WLAN AN selected by the user exists, it may also be sent to the 3GPP AAA Server if necessary.

Step 3: After detecting that the VPLMN selected by the user has changed according to the identifier of the VPLMN obtained in step 2, the 3GPP AAA Server obtains authentication and authorization information from a HLR/HSS no matter whether it has the authentication and authorization information of the user, for example, if the 3GPP server has unused authentication vectors, it needs to obtain the authentication and authorization information.

If the 3GPP AAA Server detects that the VPLMN selected by the user has not changed; but it does not store the authentication and authorization information of the user or the stored authentication and authorization information is no longer valid, the 3GPP AAA Server also needs to obtain the information from the HLR/HSS if necessary.

Step 4: The HLR/HSS checks whether the user is authorized to access VPLMN2 according to the stored list of authorized visited networks. If the user is not authorized to access the VPLMN2, the HLR/HSS returns a reject response to the 3GPP AAA Server and does not return the requested authentication and authorization information; if the user is authorized to access the VPLMN2, the HLR/HSS returns an access accept message to the 3GPP AAA Server and returns security information used for authentication and authorization information to the 3GPP AAA Server.

Step 5: If the 3GPP AAA Server receives the access accept message from the HLR/HSS and checks that the user is valid according to the security information and authorization information obtained from the HLR/HSS, it returns an authentication and authorization accept response to the WLAN UE; otherwise, it returns a reject response to the WLAN UE, not allowing the WLAN UE to access the network through VPLMN2.

Figure 7:
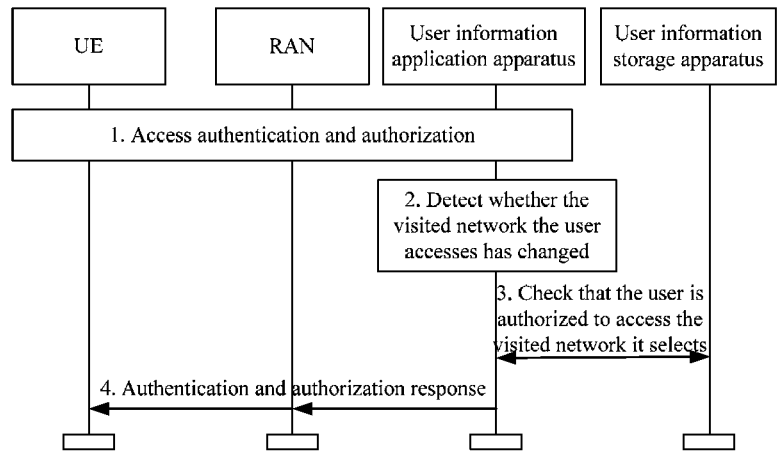
FIG. 7 shows a simplified flowchart illustrating a method for accessing a visited network in accordance with a further embodiment of the present invention.

FIG. 7 shows a simplified flowchart illustrating a method for accessing a visited network in accordance with further another embodiment of the present invention. The method may include the following steps:

Step 1: Substantially same as step 1a of the embodiment showed in FIG. 4.

Step 2: The user information application apparatus detects whether the access network and/or core network selected by the user has changed. If changed, execute step 3; otherwise, execute step 4.

Step 3: If authentication and/or authorization information are available in the user information application apparatus, the user information application apparatus may send an acknowledgement request to the user information storage apparatus, asking the user information storage apparatus to check whether the user is authorized to access the visited network. For example, the acknowledgement request may be sent to the HSS via a Diameter RAR/RAA message.

If the authentication information is not available in the user information application apparatus, the user information application apparatus may send an authentication request to the user information storage apparatus to obtain the authentication information. During the process, the user information storage apparatus checks whether the user is authorized to access the visited network.

If the authorization information is not available in the user information application apparatus, the user information application apparatus may send an authorization request to the user information storage apparatus to obtain the authorization information. During the process, the user information storage apparatus may also check whether the user is authorized to access the visited network.

Step 4: Substantially same as step 1f of the embodiment showed in FIG. 4.

Figure 8:
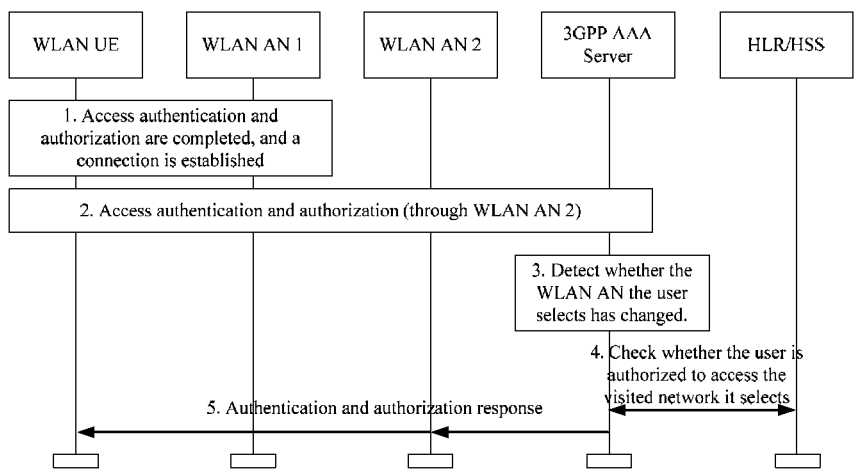
FIG. 8 shows a simplified flowchart illustrating a method for accessing a visited network in accordance with a further embodiment of the present invention.

FIG. 8 shows a simplified flowchart illustrating a method for accessing a visited network in accordance with further another embodiment of the present invention. Assuming that the visited network selected by the user has changed in this embodiment and the method may include the following steps:

Steps 1-3: Substantially same as steps 1-3 of the embodiment showed in FIG. 5.

Step 4: The 3GPP AAA Server sends a request containing the WLAN identifier to the HLR/HSS. The HLR/HSS checks whether the user is authorized to access the visited network according to the stored list of visited networks authorized and returns a response to the 3GPP AAA Server.

Step 5: Substantially same as step 5 of the embodiment showed in FIG. 5.

Figure 9:
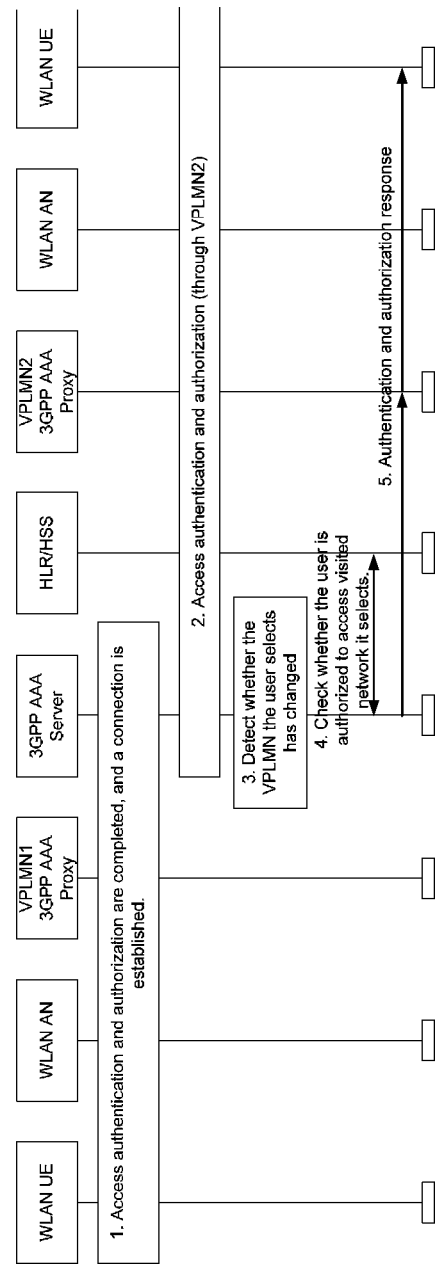
FIG. 9 shows a simplified flowchart illustrating a method for accessing a visited network in accordance with a further embodiment of the present invention.

FIG. 9 shows a simplified flowchart illustrating a method for accessing a visited network in accordance with further another embodiment of the present invention. Assuming that the visited network selected by the user has changed in this embodiment; and the method may include the following steps:

Steps 1-3: Substantially same as steps 1-3 of the embodiment showed in FIG. 6.

Step 4: The 3GPP AAA Server sends a request containing the VPLMN identifier to the HLR/HSS. The HLR/HSS checks whether the user is authorized to access the visited network according to the stored list of authorized visited networks and returns a response to the 3GPP AAA Server.

Step 5: Substantially same as step 5 of the embodiment showed in FIG. 6.

Embodiments of the present invention showed in FIG. 6 and FIG. 9 differ from embodiments showed in FIG. 5, FIG. 7, and FIG. 8. It says in the following:

In the embodiments showed in FIG. 6 and FIG. 9, if the 3GPP AAA Server detects that the visited network selected by the user has changed, it obtains the authentication and authorization information from the HSS no matter whether it has available authentication and authorization information. During the process, the HSS checks whether the user is authorized to access the visited network. This checking procedure, for example, is implemented via Diameter SAR/SAA messages.

In the embodiments showed in FIG. 5, FIG. 7 and FIG. 8, if the 3GPP AAA Server detects that the visited network selected by the user has changed and it has available authentication and authorization information, it sends an acknowledgement request to the HSS, asking the HSS to check whether the user is authorized to access the visited network without obtaining authentication and authorization information from the HSS. This checking procedure, for example, can be implemented via Diameter RAR/RAA messages.

Figure 10:
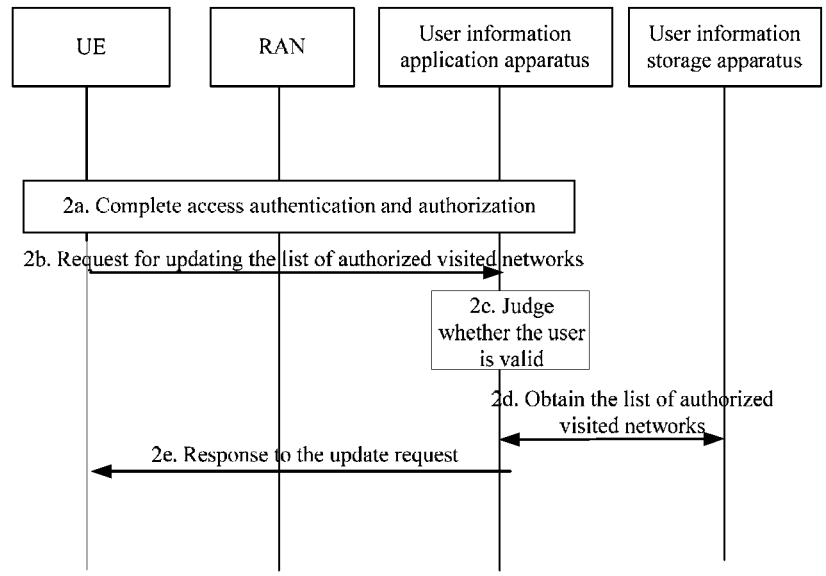
FIG. 10 shows a simplified flowchart illustrating a method for updating a list of authorized visited networks for the user to access according to an embodiment of the present invention.

Embodiments of the present invention also provide methods for updating the list of authorized visited networks stored in the UE. Three examples are as follows:

Method 1: A UE initiates a request for updating the list of authorized visited networks for the user to access periodically (refer to FIG. 10), which may include the following steps:

2a. A RAN and a user information application apparatus perform an access authentication and authorization procedure for the UE.

2b. The UE sends a request for updating the list of authorized visited networks to the user information application apparatus, asking the user information application apparatus to provide the list of authorized visited networks to the user. The request contains the user's permanent or temporary identity.

2c. Optionally, the user information application apparatus authenticates and authorizes the user and checks whether the user is valid (The user information application apparatus may interact with the user information storage apparatus in the process). If the user is invalid, the user information application apparatus returns a reject response to the UE, which may include the reason of reject, and terminates the subsequent process; if the user is valid, the user information application apparatus executes the steps below. If the above step 2a is executed, step 2c may be omitted.

2d. The user information application apparatus obtains the list of authorized visited networks from a user information storage apparatus. In the process, the user information storage apparatus provides the user information application apparatus with the list of authorized visited networks via a customized signaling message or a signaling message of the existing protocol (by adding new parameters and corresponding values in the signaling message), for example, SAR/SAA message of the Diameter protocol.

2e. The user information application apparatus returns a response message to the UE. The response message contains the list of authorized visited networks.

Optionally, the list of authorized visited networks, sent to the UE may be encrypted, for example, via an encrypted Diameter AVP or a message of encrypted EAP.

Figure 11:
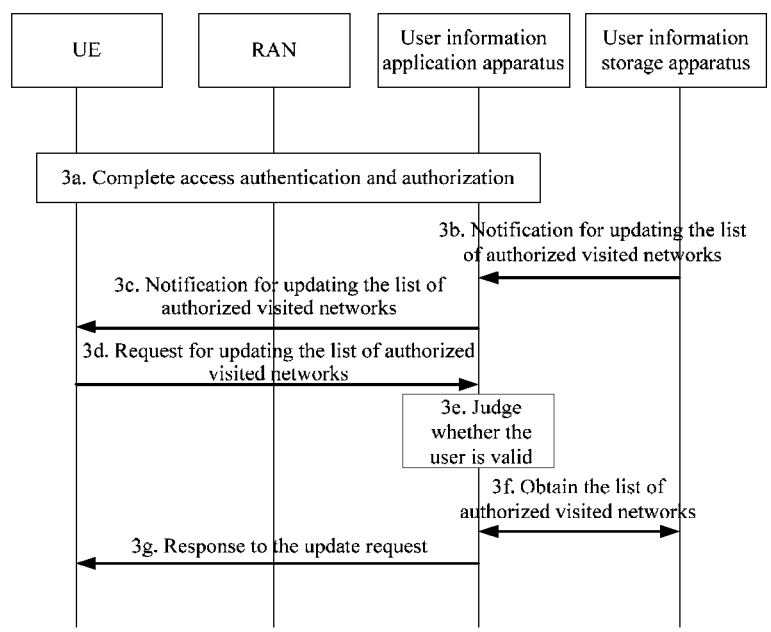
FIG. 11 shows a simplified flowchart illustrating a method for updating a list of authorized visited networks for the user to access according to an embodiment of the present invention.

Method 2: The user information storage apparatus sends a notification for updating the list of authorized visited networks for the user to access (refer to FIG. 11), which may include the following steps:

3a. A RAN and a user information application apparatus perform an access authentication and authorization procedure for the UE.

3b. The user information storage apparatus sends a notification for updating the list of authorized visited networks to the user information application apparatus, which contains the user's permanent or temporary identity, asking the user information application apparatus to notify the user to update the list of authorized visited networks.

3c. The user information application apparatus checks whether the user is online. If online, it sends the update notification to the UE; if offline, it returns a response to the user information storage apparatus, informing that the user is offline and cannot be notified. The user information application apparatus may also store the update notification temporarily for some time. If the user is online in the period, the user information application notifies the user; otherwise, it returns a response to the user information storage apparatus, informing that the user cannot be notified.

3d. Upon receiving the update notification, the UE sends a request for updating the list of visited networks authorized to the user information application apparatus, asking the user information application apparatus to provide the list of authorized visited networks. The request contains the user's permanent or temporary identity.

3e. Optionally, the user information application apparatus authenticates and authorizes the user and checks whether the user is valid (The user information application apparatus may interact with the user information storage apparatus in the procedure). If the user is invalid, the user information application apparatus returns a reject response to the UE, which may include the reason of reject, and terminates the subsequent process; if the user is valid, the user information application apparatus executes the steps below. If the above step 3a is executed, step 3e may be omitted.

3f. The user information application apparatus obtains the list of authorized visited networks from the user information storage apparatus. In the procedure, the user information storage apparatus provides the user information application apparatus with the list of authorized visited networks via a customized signaling message or a signaling message of the existing protocol (by adding new parameters and corresponding values), for example, a SAR/SAA message or an AAR/AAA message of the Diameter protocol.

3g. The user information application apparatus returns a response message to the UE. The response message contains the list of authorized visited networks.

Optionally, the list of authorized visited networks sent to the UE may be encrypted, for example, via an encrypted Diameter AVP or an encrypted EAP message.

Figure 12:
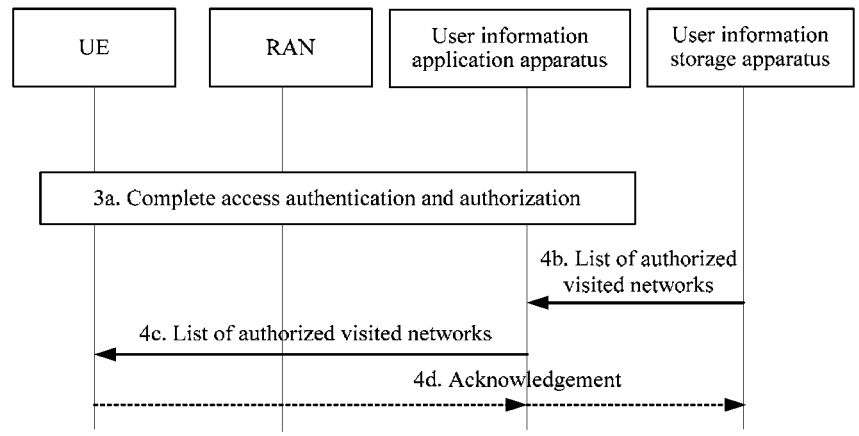
FIG. 12 shows a simplified flowchart illustrating a method for updating a list of authorized visited networks for the user to access according to an embodiment of the present invention.

Method 3: The user information storage apparatus pushes the list of authorized visited networks (refer to FIG. 12), which may include the following steps:

4a. A RAN and a user information application apparatus perform an access authentication and authorization procedure for a UE.

4b. The user information storage apparatus pushes the updated list of authorized visited networks (containing the user's permanent or temporary identity) to the user information application apparatus, asking the user information application apparatus to notify the user to update the list of authorized visited networks.

The user information storage apparatus may push the list of authorized visited networks to the user information application apparatus via a customized signaling message or a signaling message of the existing protocol (by adding new parameters and corresponding values), for example, a SAR/SAA message or an AAR/AAA message of the Diameter protocol or a Change-of-Authorization (CoA) message of the RADIUS protocol.

4c. The user information application apparatus pushes the updated list of visited networks authorized to the UE.

The user information application apparatus may push the list of authorized visited networks to the UE via a customized signaling message or a signaling message of the existing protocol (by adding new parameters and corresponding values), for example, a Push-Profile-Request/-Answer(PPR/PPA) message or a SAR/SAA message of the Diameter protocol or a CoA message of the RADIUS protocol.

Optionally, the list of authorized visited networks sent to the UE may be encrypted, for example, via an encrypted Diameter AVP or an encrypted EAP message.

4d. Optionally, after the UE has updated the list of authorized visited networks, the UE returns an update acknowledgement message to the user information application apparatus. Then, the user information application apparatus sends the acknowledgement message to the user information storage apparatus.

In the flows of 2a-2e, 3a-3g and 4a-4d, the user information application apparatus may be an AAA server, or a dedicated application server used for user software and information upgrade, or a common application server, and the user information storage apparatus may be an HLR, or an HSS, or a database for storing user information.

Figure 13:
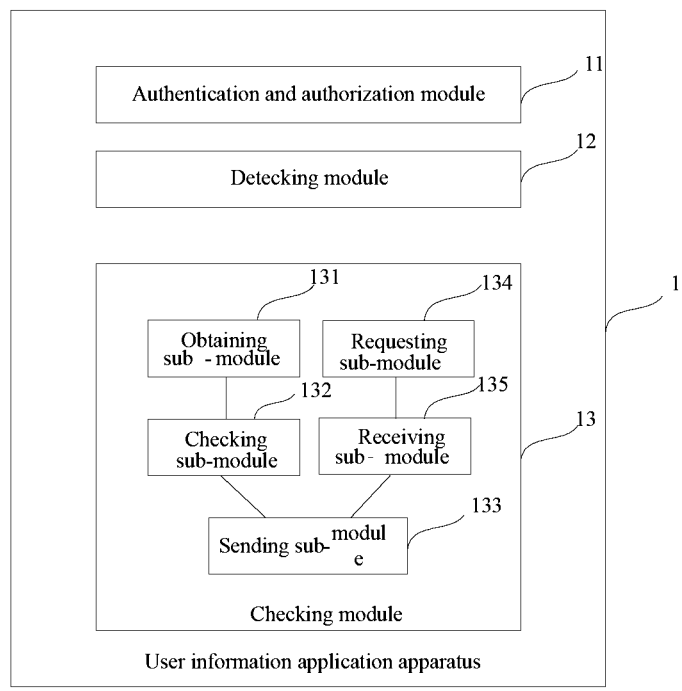
FIG. 13 shows a schematic diagram of a user information application apparatus according to an embodiment of the present invention.

FIG. 13 shows a schematic diagram of a user information application apparatus according to an embodiment of the present invention. The user information application apparatus includes:

an authentication and authorization module 11;
a detecting module 12; and
a checking module 13.

The authentication and authorization module 11 is adapted to receive an access authentication and/or authorization request initiated by a user, check whether the user is valid according to an authentication and/or authorization information of the user, and return an authentication and/or authorization accept or reject response to the user according to the result of checking whether the user is authorized to access the visited network by the checking module 13.

The detecting module 12 is adapted to detect whether the visited network selected by the user has changed. If the visited network has changed, the checking module 13 is triggered.

The checking module 13 is adapted to obtain a list of authorized visited networks from the user information storage apparatus 2 and check whether the user is authorized to access the visited network according to the information of the list of authorized networks; or the checking module 13 is adapted to request the user information storage apparatus 2 to check whether the user is authorized to access the visited network and send the checking result to the authentication/authorization module 11.

The checking module 13 may include:

an obtaining sub-module 131, which is adapted to obtain the list of authorized visited networks from the user information storage apparatus 2 and stores the list;
a checking sub-module 132, which is adapted to check whether the user is authorized to access the visited network according to the obtained list of authorized visited networks;
a sending sub-module 133, which is adapted to send the checking result of the checking sub-module 132 to the authentication and authorization execution module 11.

The checking module 13 may also include:

a requesting sub-module 134, which is adapted to send an acknowledgement request message containing the identifier of the visited network to the user information storage apparatus 2, requesting the user information storage apparatus 2 to check whether the user is authorized to access the visited network;
a receiving sub-module 135, which is adapted to receive the result of checking whether the user is authorized to access the visited network by the user information storage apparatus 2.

The sending sub-module 133, which is adapted to send the checking result of the receiving sub-module 135 to the authentication and authorization execution module 11.

Figure 14:
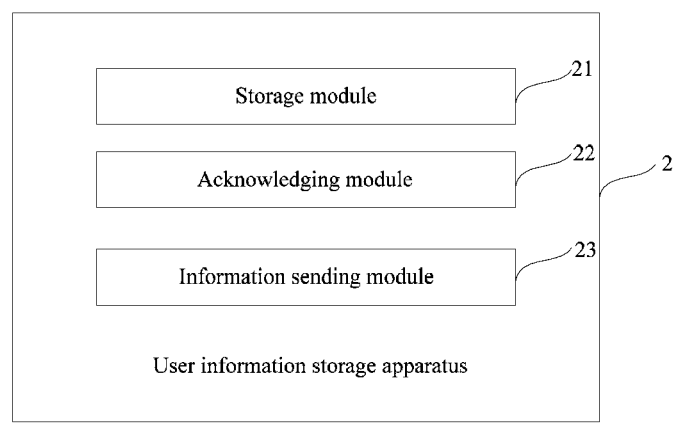
FIG. 14 shows a schematic diagram of a user information storage apparatus according to an embodiment of the present invention.

FIG. 14 shows a schematic diagram of a user information storage apparatus according to an embodiment of the present invention. The user information storage apparatus includes:

a storage module 21; and
an information sending module 23.

The storage module 21 is adapted to store a list of authorized visited networks and the authentication and/or authorization information of a user.

The information sending module 23 is adapted to send the list of visited networks authorized and authentication and/or authorization information of the user to the user information application apparatus 1.

The user information storage apparatus may also include an acknowledging module 22:

The acknowledging module 22 is adapted to receive an acknowledgement request message containing the identifier of the visited network from the user information application apparatus 1, check whether the user is authorized to access the visited network according to the list of authorized visited networks stored in the storage module 21, and send the checking result to the information sending module 23.

The information sending module 23 is adapted to send the checking result of the acknowledging module 22 to the user information application apparatus 1.

Figure 15:
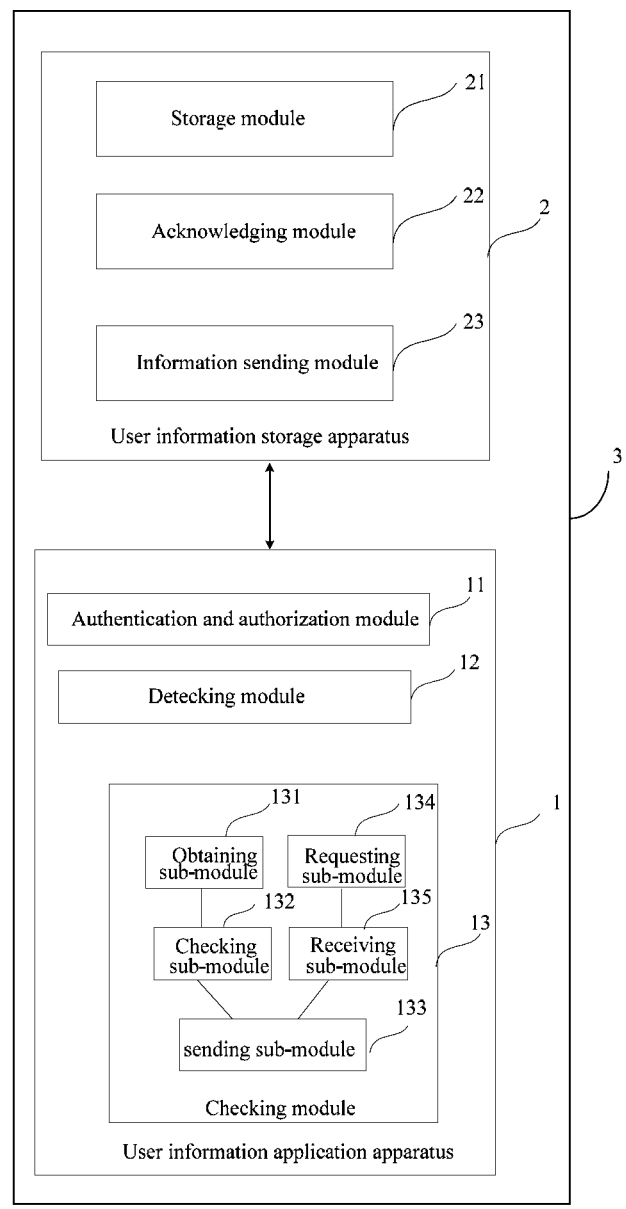
FIG. 15 shows a schematic diagram of a system according to an embodiment of the present invention.

FIG. 15 shows a schematic diagram of a system for accessing a visited network according to an embodiment of the present invention. The system may include:

a user information application apparatus 1; and
a user information storage apparatus 2.

The user information storage apparatus and the user information application apparatus may be independent network entities and set separately as required, for example, a HLR/HSS as the user information storage apparatus and a 3GPP AAA Server as the user information application apparatus in a 3GPP system; or integrated in a functional entity and serve as different logical units of the functional entity, between which the interfaces are internal interfaces.

To sum up, when a user selects a visited network and initiates an authentication and authorization request, the embodiment of the present invention provides effective authentication and authorization signaling flows. The method provided by the embodiment of the present invention can effectively check whether the user is authorized to access the visited network.

The embodiment of the present invention also provides three methods for updating the list of authorized visited networks stored in the UE so that the list of authorized visited networks stored in the UE can be updated synchronously with the visited networks authorized by the operator.

Although the present invention has been illustrated and described with reference to some preferred embodiments, the present invention is not limited to these. Those skilled in the art may make various variations and modifications without departing from the spirit and scope of the invention. The present invention shall cover these modifications and variations.

What is claimed is:

1. A method for accessing a visited network, comprising:
receiving, by an authentication, authorization and accounting (AAA) server device, an access request initiated by a user for selecting the visited network, wherein the access request comprises an identifier of the visited network;
detecting, by the AAA server device, whether the visited network selected by the user has changed according to the identifier of the visited network;
if the visited network selected by the user has changed, initiating, by the AAA server device, a request for obtaining authentication and/or authorization information of the user from a home subscriber server (HSS), and requesting the HSS to check whether the user is authorized to access the visited network according to a list of authorized visited networks stored in the HSS; and receiving, by the AAA server device, a response from the HSS, wherein the response comprises a result of checking whether the user is authorized to access the visited network.

2. The method of claim 1, wherein the response from the HSS further comprises the requested authentication and/or authorization information of the user when the result is that the user is authorized to access the visited network.

3. The method of claim 1, wherein the request comprises the identifier of the visited network for requesting the HSS to check whether the user is authorized to access the visited network.

4. The method of claim 1, wherein the visited network is a Wireless Local Area Network (WLAN) access network.

5. The method of claim 1, wherein the visited network is a $3^{rd}$ Generation Partnership Project (3GPP) visited public land mobile network (VPLMN).

6. The method of claim 1, wherein the request is a Server-Assignment-Request (SAR) message of a Diameter protocol, and the response is a Server-Assignment-Answer (SAA) message of the Diameter protocol.

7. An authentication, authorization and accounting (AAA) server device in a wireless telecommunication network, comprising:

a receiver, configured to receive an access request initiated by a user for selecting a visited network, wherein the access request comprises an identifier of the visited network; and a processor, connected to the receiver and configured to:

detect whether the visited network selected by the user has changed according to the identifier of the visited network;

if the visited network selected by the user has changed, initiate a request, for obtaining authentication and/or authorization information of the user from a home subscriber server (HSS), and requesting the HSS to check whether the user is authorized to access the visited network according to a list of authorized visited networks stored in the HSS;

the receiver further configured to receive a response from the HSS, wherein the response comprises a result of checking whether the user is authorized to access the visited network.

8. The AAA server device of claim 7, wherein the response further comprises the requested authentication and/or authorization information of the user when the result is that the user is authorized to access the visited network.

9. The AAA server device of claim 7, wherein the request comprises the identifier of the visited network for requesting the HSS to check whether the user is authorized to access the visited network.

10. The AAA server device of claim 7, wherein the visited network is a Wireless Local Area Network (WLAN) access network.

11. The AAA server device of claim 7, wherein the visited network is a $3^{rd}$ Generation Partnership Project (3GPP) visited public land mobile network (VPLMN).

12. The AAA server device of claim 7, wherein the request is a Server-Assignment-Request (SAR) message of a Diameter protocol, and the response is a Server-Assignment-Answer (SAA) message of the Diameter protocol.

13. A wireless telecommunication system, in which an authentication, authorization and accounting (AAA) server device communicates with a home subscriber server (HSS) device; wherein the AAA server device is configured to:

receive an access request initiated by a user for selecting a visited network, wherein the access request comprises an identifier of the visited network;

detect whether the visited network selected by the user has changed according to the identifier of the visited network;

if the visited network selected by the user has changed, initiate a request for obtaining authentication and/or authorization information of the user from the HSS, and asking requesting the HSS to check whether the user is authorized to access the visited network according to a list of authorized visited networks stored in the HSS; and receive a response from the HSS, wherein the response comprises a result of checking whether the user is authorized to access the visited network.

14. The system of claim 13, wherein the response further comprises the requested authentication and/or authorization information of the user when the result is that the user is authorized to access the visited network.

15. The system of claim 13, wherein the request comprises the identifier of the visited network for requesting the HSS to check whether the user is authorized to access the visited network.

16. The system of claim 13, wherein the visited network is a Wireless Local Area Network (WLAN) access network.

17. The system of claim 13, wherein the visited network is a $3^{rd}$ Generation Partnership Project (3GPP) visited public land mobile network (VPLMN).

18. The system of claim 13, wherein the request is a Server-Assignment-Request (SAR) message of a Diameter protocol, and the response is a Server-Assignment-Answer (SAA) message of the Diameter protocol.

* * * * *